Feb. 26, 1924.

O. FRISK

SAW SET

Filed Aug. 8, 1921

1,485,114

WITNESS:

INVENTOR.
O. Frisk
BY H.J. Sanders
ATTORNEY.

Patented Feb. 26, 1924.

1,485,114

UNITED STATES PATENT OFFICE.

OTTO FRISK, OF KIRON, IOWA, ASSIGNOR TO A. E. ANDERSON, OF KIRON, IOWA.

SAW SET.

Application filed August 8, 1921. Serial No. 490,673.

*To all whom it may concern:*

Be it known that I, OTTO FRISK, a citizen of Sweden, residing at Kiron, in the county of Crawford and State of Iowa, have invented certain new and useful Improvements in Saw Sets, of which the following is a specification.

This invention relates to improvements in saw sets and its object is to provide a simple practical device of this class that is cheap to manufacture and efficient in operation. A further object is to provide a tool of this type of so few parts and so compact that it will occupy the minimum space and be easily carried in the pocket.

With the foregoing and other objects in view the invention consists in the combination and arrangement of parts to be hereinafter fully described, pointed out in the appended claim and illustrated in the accompanying drawing which forms a part of this application and in which—

Like reference characters denote corresponding parts in both views.

Figure 1:
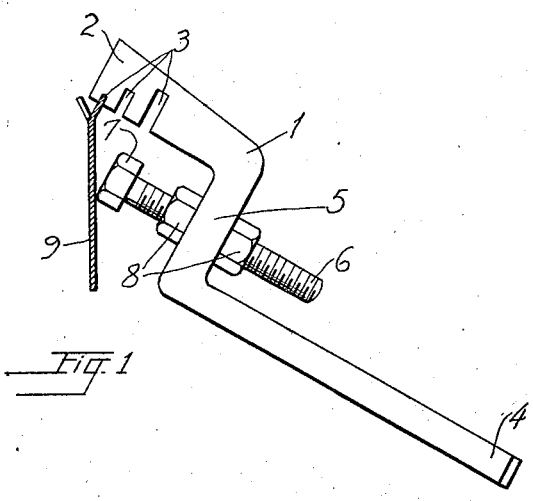
Fig. 1 is a view of the saw set in side elevation illustrating its application.
Figure 2:
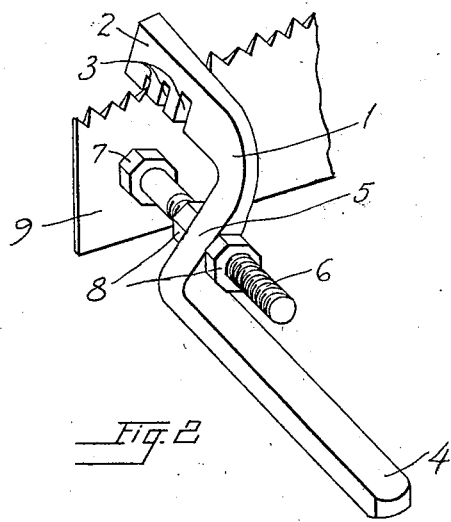
Fig. 2 is a perspective view of Fig. 1.

The tool comprises a substantially Z-shaped frame 1, the head 2 thereof being formed with the different sized notches 3 and the frame-end 4 comprising the handle portion. The intermediate frame portion 5 is formed with a threaded perforation to receive the screw gage 6 having the head 7 and upon said screw gage the nuts 8 are arranged upon opposite sides of the frame, said nuts serving to retain the screw in adjusted position with relation to the frame.

In use the saw blade 9, supported in a vise, has its teeth, one at a time, engaged by the notched frame-head portions 3, the notch employed depending upon the thickness of the saw teeth. The screw is so set with relation to the frame 1 that the head 7 will contact with the face of the saw blade when the frame is moved, by pressure exerted upon the handle, toward the blade and the proper cant given the tooth. The exact cant of the tooth may be a matter of preference left to the party using the saw or it may depend upon the nature of the work to be done with the saw. The operator will apply the tool to alternate teeth upon one side of the saw blade and then work upon the intermediate teeth from the opposite side of the blade.

What is claimed is:—

In a saw set, a frame comprising substantially parallel ends, one of said ends terminating in a head and being formed with a plurality of parallel notches, the depth of the successive notches increasing as they recede from said head, the intermediate portion of said frame being disposed at right angles to said ends and formed with a threaded perforation, a screw gage arranged in said threaded perforation and disposed parallel to the ends of said frame, and means for locking said gage in adjusted position.

In testimony that I claim the foregoing as my own I have hereto affixed my signature in the presence of two subscribing witnesses.

OTTO FRISK.

Witnesses:
OSCAR C. OLSON,
W. J. SANDBERG.